Nov. 25, 1930.                E. SCHRÖDER                    1,782,634
          THREEPHASE-ONEPHASE CONVERTER, ESPECIALLY FOR ELECTRIC
                  RESISTANCE HEATING AND WELDING MACHINES
                           Filed June 13, 1927
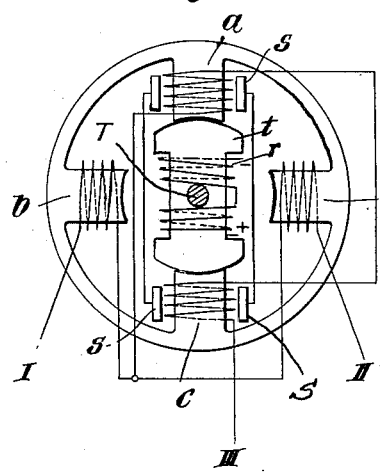
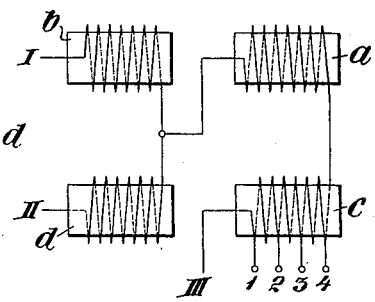
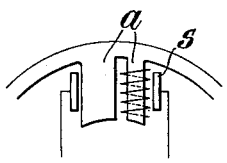
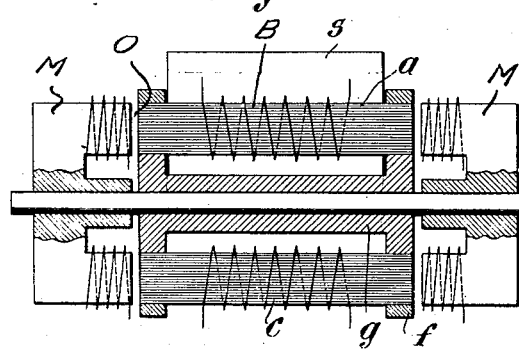
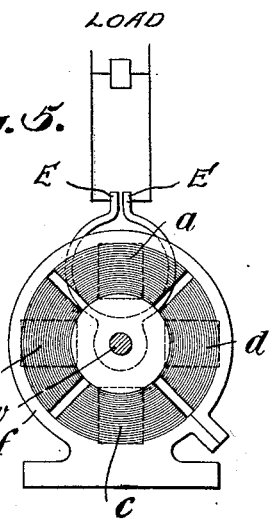
INVENTOR
EDMUND SCHRODER Patented Nov. 25, 1930

1,782,634

UNITED STATES PATENT OFFICE

EDMUND SCHRÖDER, OF BERLIN, GERMANY

THREE-PHASE ONE-PHASE CONVERTER, ESPECIALLY FOR ELECTRIC RESISTANCE HEATING AND WELDING MACHINES

Application filed June 13, 1927, Serial No. 198,610, and in Germany July 6, 1925.

My invention relates to a new constructional form of a converter for transforming three-phase current to single-phase current in such a manner that the single-phase current is generated directly in the secondary coil which conducts the welding current and consists generally of only one winding. A converter of this kind is suited, of course, for machines having a larger output.

Referring to the drawings, Figures 1 and 2 are diagrammatic views illustrating one manner of carrying the invention into effect.

Figure 3 illustrates a modified pole formation.

Figure 4 is a longitudinal section and Figure 5 an end view showing diagrammatically another form of machine constructed in accordance with my invention.

A field-magnet $t$ is connected up in the manner of a double T-armature which is excited by continuous current windings $r$. This armature rotates between 4 poles $a$, $b$, $c$ and $d$ connected with each other in the manner shown in Fig. 2. They are excited from a three phase system by windings arranged in accordance with the well known Scott connections. The three phases being indicated by I, II, III. The pole $a$ is also surrounded by a single-turn winding $s$ forming the secondary of a transformer. If desired a similar secondary winding may be arranged in combination with the pole $c$ as shown in Figure 1, the two windings being connected together in parallel. If the rotor is provided with a few rods connected in such a manner as to form a cage armature, this armature starts asynchronously when switched on, and passes over into synchronism when also the excitation is switched on. The manner of acting upon the secondary coil S which surrounds the pole $a$ (the secondary can, however, be subdivided, also into two parts connected in parallel) is as follows:

I. The two phases are connected up so that with an open secondary coil the rotor acts like a rotor of a two-phase synchronous motor. The field excited by the rotor lies always 90° behind the pole fields and, therefore, also 90° behind the fields produced by poles $a$ and $c$. If now the secondary coil is closed, that is to say, if current is drawn from it, the field generated by it will lie about 180° behind the primary field of $a$ and $c$, and the field produced by the armature will, therefore, lie 90° in front of the voltage, or of the field of the secondary winding S respectively. In this case, however, the rotor field increases the voltage of the secondary winding. Therefore, the primary winding lying upon $a$ and $c$ need only be of such a size that one half of the working voltage is induced in the secondary winding S by the primary windings, whereas the other half is produced by the rotor field. Owing hereto, the rotor is, however, retarded in that it now acts as generator upon the secondary winding or coil. It is however easily possible to so proportion the number of turns on poles $b$ and $d$ that the current generated by the rotor in the secondary coil is approximately equal to that drawn from the phases exciting $b$ and $d$ whereby the load on the three phases is rendered uniform.

II. The connection can be made also in another manner, as follows: After the rotor has been brought to a synchronous number of revolutions, the phase III is inverted, whereby the direction of the field becomes counter to the direction of rotation of the rotor. Now the rotor field lies 90° in front of the field in $a$ and $c$ and increases, therefore, the voltage in the primary coil, that is to say, the effect is the same as if the motor should run as the rotor of a generator connected up in series with the generator producing the three-phase current. The voltage in the phase III is thereby doubled at full output so that the ampere load in all phases is equal, whereas the voltage in the phase III is doubled. Therefore, also in this case the primary coils of $a$ and $c$ are so chosen that without the rotor field it produces only half the voltage in the secondary coil S.

Figures 3, 4 and 5, as well as the step-connection illustrated in Fig. 2, show a constructional form for a converter operating with a rotor with six poles. The secondary coil S, Figs. 3 and 4, is designed in this case to support the shaft W of the rotating parts which consist in this case of two magnet wheels m, acting with their plane faces or sides. From the axial section illustrated in Fig. 5 it can be seen that the secondary member is provided with lugs forming inner supports for 4 laminated magnet cores located parallel to the axis, and the end faces of which act as pole faces upon the magnet wheels m. The magnet cores are retained in place on the secondary member by slit rings f, Figs. 4 and 5. The coils of the cores are connected with each other in the same manner as in Fig. 2, and the core c (Fig. 2) has a coil with tapping points 1, 2, 3 and 4 so that by supplying current over any one of these tapping points the number of turns on a and c and, thus, also the field value in a and c, and, as a further consequence, the voltage excited in the secondary coil by the phase III can be regulated.

E E, Fig. 5 shows the poles of the secondary coil which are connected with the working members of the welding machine.

Fig. 5 shows a section in the plane G—O of Fig. 4, looking from the left to the right; it is to be seen from this figure that the faces of the 4 cores are provided with separate, circularly curved pole shoes, whereby the field saturation in the air gaps is maintained very small.

It is possible to attain, by choosing suitably the number of turns, that all three phases of the three-phase net are uniformly loaded. Furthermore, it is particularly valuable that by suitably choosing the excitation on the magnet-wheels always the power factor 1 can be attained. This is particularly valuable for heavy butt-welding machines and heavy heating machines. These large machines from 50 to 300 kilo-volt-amperes primary reception work, with the present one-phase design, with power-factors of from 0, 2 to 0, 3, so that, as regards, for instance, butt-welding machines, which require effectively from 28 to 30 kilo-watt, machine performances of from 100 to 120 kilo-volt-ampere must be employed.

As, now, the present improved converter design permits firstly to attain the power factor 1, secondly, to distribute the load on all three phases, whereas hitherto one phase had to stand the entire load, the ampere-load per individual phase is, with the present improved design, only from 1/15 to 1/6 of the former load for the same output. The slight running light or idle of the magnet wheels is of no importance whatever in proportion to the advantages stated.

With that constructional form for which Fig. 1 forms the basis, it is particularly easy to attain another simplification of the converter, in that it is possible to use for the rotor a material having a high remanence. A rotor of this kind ought to be roller-shaped and provided with two broad slots giving it the character of a double-T-armature. If, then, that field which acts as motor is excited somewhat higher it will be found that this is sufficient to make the rotor act as a super-excited rotor for the second field owing to the remanence. A converter of this kind is particularly simple, in that the armature need not be supplied with excited current. It is true, that the power factor attained will be a little below 1, but it will be high enough (0,95–0,96) to be called "very good." This rotor design is very advantageous especially for converters of small size.

Also the rotor shown in Fig. 4 can be made of material having a high remanence and will then render the effect stated in the preceding paragraph; the constructional form illustrated in Fig. 1 may be designed with 8 poles instead of with only 4.

The invention is not limited to the examples above described, as subordinate mechanical or electrical details can be varied to meet different requirements. Further, whilst the invention is primarily intended for use in conjunction with resistance heating and welding machines, it is applicable to other analogous uses.

I claim:

1. In an alternating current converter, the combination with a rotor, a two phase Scott-connected stator primary winding, a secondary stator winding in inductive relation with one phase only of the primary winding whereby voltage is induced in said secondary winding by the rotor and by transformer actions, the secondary winding being connected to a load circuit.

2. In an alternating current converter, the combination of a rotor having a direct current winding thereon, a stator having two phase Scott-connected primary windings, a secondary stator winding in inductive relation with one phase only of the primary windings, whereby voltage is induced in said secondary winding by the rotor and transformer actions, said secondary winding being connected to a load circuit.

3. In an alternating current converter, the combination of a rotor having a winding thereon, said winding being adapted to be supplied with a direct current, a stator having two phase Scott-connected primary windings and adapted to be supplied with power from a three phase source of supply, and secondary stator windings in inductive relation with one phase only of the primary windings, whereby voltage is induced in the secondary windings by means of the rotor and induced therein by transformer action of the stator windings.

4. In an alternating current converter, the combination of a rotor, a stator primary winding having a number of phases which can be divided equally by 2, said windings of said stator being Scott connected, secondary stator windings in inductive relation with a pair of said stator windings of the same phase whereby the voltage is generated in said secondary windings by means of the rotor and induced therein by transformer action of the stator winding, said secondary windings being connected in parallel.

5. In an alternating current converter, the combination of a rotor, a stator having a Scott-connected primary winding and a number of poles which can be divided equally by 2, each of a pair of said poles being divided and having one phase only of the primary winding surrounding one division only of each of said divided poles, and a secondary winding surrounding one pair only of the divided poles of the stator, whereby voltage is generated in the secondary winding by means of the rotor and induced therein by transformer actions.

In testimony whereof I affix my signature.

EDMUND SCHRÖDER.